United States Patent
Witinski et al.

(10) Patent No.: US 9,784,620 B2
(45) Date of Patent: Oct. 10, 2017

(54) SPECTROSCOPY SYSTEMS AND METHODS USING QUANTUM CASCADE LASER ARRAYS WITH LENSES

(71) Applicant: Pendar Technologies, LLC, Cambridge, MA (US)

(72) Inventors: Mark F. Witinski, Cambridge, MA (US); Laurent Diehl, Somerville, MA (US); Christian Pfluegl, Arlington, MA (US)

(73) Assignee: Pendar Technologies, LLC, Cambridge, MA (US)

( * ) Notice: Subject to any disclaimer, the term of this patent is extended or adjusted under 35 U.S.C. 154(b) by 0 days.

(21) Appl. No.: 14/985,722

(22) Filed: Dec. 31, 2015

(65) Prior Publication Data

US 2016/0116337 A1  Apr. 28, 2016

Related U.S. Application Data

(63) Continuation of application No. 13/873,636, filed on Apr. 30, 2013, now Pat. No. 9,255,841.
(Continued)

(51) Int. Cl.
G01J 3/42 (2006.01)
G01J 3/02 (2006.01)
G01J 3/10 (2006.01)

(52) U.S. Cl.
CPC .............. *G01J 3/42* (2013.01); *G01J 3/0208* (2013.01); *G01J 3/0286* (2013.01);
(Continued)

(58) Field of Classification Search
None
See application file for complete search history.

(56) References Cited

U.S. PATENT DOCUMENTS 6,795,190 B1  9/2004  Paul et al.
7,384,581 B2  6/2008  Katzir
(Continued)

OTHER PUBLICATIONS

A. E. Siegman, "How to (Maybe) Measure Laser Beam Quality," Tutorial presentation at the Optical Society of America Annual Meeting, Long Beach, California, Oct. 1997.
(Continued)

*Primary Examiner* — Shawn Decenzo
(74) *Attorney, Agent, or Firm* — Cooley LLP

(57) ABSTRACT

A spectroscopy system includes an array of quantum cascade lasers (QCLs) that emits an array of non-coincident laser beams. A lens array coupled to the QCL array substantially collimates the laser beams, which propagate along parallel optical axes towards a sample. The beams remain substantially collimated over the lens array's working distance, but may diverge when propagating over longer distances. The collimated, parallel beams may be directed to/through the sample, which may be within a sample cell, flow cell, multipass spectroscopic absorption cell, or other suitable holder. Alternatively, the beams may be focused to a point on, near, or within the target using a telescope or other suitable optical element(s). When focused, however, the beams remain non-coincident; they simply intersect at the focal point. The target transmits, reflects, and/or scatters this incident light to a detector, which transduces the detected radiation into an electrical signal representative of the target's absorption or emission spectrum.

17 Claims, 11 Drawing Sheets

.05 m ⟶ 10 m

Distance from Array

Related U.S. Application Data

(60) Provisional application No. 61/640,482, filed on Apr. 30, 2012.

(52) U.S. Cl.
CPC ............... *G01J 3/0291* (2013.01); *G01J 3/10* (2013.01); *G01J 2003/102* (2013.01)

(56) References Cited

U.S. PATENT DOCUMENTS

| | | | |
|---|---|---|---|
| 7,826,502 B2 | 11/2010 | Lu et al. | |
| 2006/0132771 A1* | 6/2006 | Saito | G01N 15/1459 356/338 |
| 2007/0047599 A1 | 3/2007 | Wysocki et al. | |
| 2007/0158571 A1 | 7/2007 | Cole et al. | |
| 2008/0170218 A1 | 7/2008 | Dantus et al. | |
| 2008/0186488 A1* | 8/2008 | Kiesel | G01N 21/39 356/335 |
| 2009/0194697 A1 | 8/2009 | Staniforth et al. | |
| 2009/0257054 A1* | 10/2009 | Hargis | G01J 3/10 356/246 |
| 2011/0216792 A1 | 9/2011 | Chann et al. | |
| 2012/0033697 A1 | 2/2012 | Goyal et al. | |
| 2013/0292571 A1 | 11/2013 | Mukherjee et al. | |
| 2015/0003061 A1* | 1/2015 | Brukilacchio | G01N 21/8806 362/237 |

OTHER PUBLICATIONS

Anderson et al., "Ultrasensitive Absorption Spectroscopy with a High-Finesse Optical Cavity and Off-Axis Alignment," Applied Optics 40, 4904 (2001).

Benjamin G. Lee et al., "Beam combining of quantum cascade laser arrays," Optics Express, vol. 17, No. 18, pp. 16216-16224 (Aug. 31, 2009).

D. R. Herriott et al., "Folded Optical Delay Lines," Applied Optics 4, 883 (1965).

Fan, "Laser Beam Combining for High-Power, High-Radiance Sources," IEEE J. Sel. Top. Quantum Electron. 11, 567 (2005).

Goyal et al., "Dispersion Compensated Wavelength Beam Combining of Quantum Cascade Laser Arrays," Optics Express 19, 26725 (2011).

Hugger et al., "Power Scaling of Quantum Cascade Lasers Via Multiemitter Beam Combining," Optical Engineering 49, 111111 (2010).

J. J. Scherer, J. B. Paul, A. O'Keefe, R. J. Saykally: Chem. Rev. 97, 25 (1997).

Lee et al., "Widely Tunable Single-Mode Quantum Cascade Laser Source for Mid-Infrared Spectroscopy," Appl. Phys. Lett. 91, 231101 (2007).

Patrick Rauter et al., "High-power arrays of quantum cascade laser master-oscillator power-amplifiers," Optics Express, vol. 21, Issue 4, pp. 4518-4530 (2013)http://dx.doi.org/10.1364/OE.21.004518.

Tobias S. Mansuripur et al., "Widely tunable mid-infrared quantum cascade lasers using sampled grating reflectors," Optics Express, vol. 20, Issue 21, pp. 23339-23348 (2012) http://dx.doi.org/10.1364/OE.20.023339.

* cited by examiner

.05 m → 10 m
Distance from Array

SPECTROSCOPY SYSTEMS AND METHODS USING QUANTUM CASCADE LASER ARRAYS WITH LENSES

CROSS-REFERENCE TO RELATED APPLICATIONS

This application is a continuation of U.S. patent application Ser. No. 13/873,636, filed Apr. 30, 2013, and entitled "Spectroscopy Systems and Methods Using Quantum Cascade Laser Arrays with Lenses," which claims the benefit, under 35 U.S.C. §119 (e), of U.S. Patent Application No. 61/640,482, filed Apr. 30, 2012, and entitled "Spectroscopy Systems and Methods Using Quantum Cascade Laser Arrays with Lenses." Each of these applications is incorporated herein by reference in its entirety.

BACKGROUND

An individual tunable semiconductor laser can be used for spectroscopic analysis of solids, gases and liquids. Sometimes, the laser is optically coupled to an absorption cell, which serves two roles in the spectrometer system: (1) the absorption cell provides a defined absorption path length so that quantitative analysis of the sample can be implemented according to, for example, the Beer-Lambert relation for molecular absorption; and (2) the absorption cell can be configured to allow for greater optical path length than any single cell dimension through the use of multipass geometries. Greater optical path length translates to greater absorption signal, which in turn translates into a higher Signal to Noise Ratio (SNR) and a higher sensitivity.

Conventionally, when a tunable laser is used with an optical absorption cell, light from the laser is substantially collimated into the cell so as to reduce divergence and allow greater transmission through the cell and higher detection efficiency. This is true whether the light makes one single pass through the cell before detection or whether it traverses more than one pass as in Herriott cell or White cell based spectroscopy, cavity ringdown spectroscopy, and integrated cavity output spectroscopy (collectively: "multipass spectroscopy"). For more on integrated cavity output spectroscopy, see U.S. Pat. No. 6,795,190, entitled "Absorption Spectroscopy Instrument with Off-Axis Light Insertion into Cavity," which is incorporated herein by reference in its entirety.

Not all spectroscopy systems use absorption cells. For example, the laser beam may be directed toward a target and its wavelength tuned while the backscattered photons are detected and analyzed. A common instance of this embodiment is the standoff detection of surface adsorbed condensed phase material using, for example, infrared absorption or Raman spectroscopies.

For broader wavelength coverage tunable laser arrays can also be used for spectroscopy, both with and without absorption cells. For more on continuously or broadly tunable laser arrays, see U.S. Pat. No. 7,826,509 "Broadly Tunable Single-Mode Quantum Cascade Laser Sources and Sensors," which is incorporated herein by reference in its entirety. In this work, an array of single frequency Quantum Cascade Lasers, each member with its own wavelength, is used to obtain broader absorption spectra than would be obtainable using just one single frequency laser. This is especially useful for the spectroscopic analysis of condensed phased materials and for analysis of multiple gases, where broader spectral coverage is highly beneficial.

In either case, using a single emitter or an array of emitters, the laser beams' divergence often limits the obtainable signal to noise ratio as high divergence reduces the available optical transmitted or backscattered optical power per unit area for detection when interrogating samples over long path lengths, including those in multipass sample cells or standoff spectroscopy. In addition, portions of the diverging beams may interrogate different portions of the sample volume. As a result, different portions of the detected absorption spectrum may correspond to different parts of the sample. This can be especially troublesome when interrogating condensed phase samples that are not perfectly homogenous.

In the case of single emitters, the common solution to reduce divergence is to place an optical element with focusing power, such as a lens, in front of the emitter. However, for emitter arrays, a single lens is not always appropriate. This is illustrated in FIG. 1, which illustrates how diverging beams 111 emitted by lasers 112 in a laser array 110 are coupled to a single lens 120. The lens 120 is positioned with its optical axis perpendicular to the face of the laser array 120 at a distance roughly equal to the lens's focal length and produces a set of collimated beams 121. Although the lens 120 collimates the diverging beams 111 emitted by the laser array, the resulting collimated beams 121 are tilted with respect to each other by an amount that depends on both the beam's position. If the lens 120 has a focal length f, the collimated beam 121 from the nth laser in the array 110 points at an angle given by:

$$\Delta\theta_n = \tan^{-1}\left(\frac{\Delta x_n}{f}\right) \quad (1)$$

In equation (1), $\Delta\theta_n$ is measured with respect to the axis of the lens 120 and $\Delta x_n$ is the transverse position of the nth laser in the array 110 relative to the focal point of the lens 120. In this case, the laser beams are spatially separated in the far-field 130, as shown. Thus, collimation of diverging beams 111 from an entire array 110 using a single lens 120 exacerbates, rather than corrects, many of the problems associated with using a tunable laser array instead of a single tunable laser for spectroscopy by introducing an angular difference between output beams where previously there was only a lateral offset.

Wavelength beam-combining (WBC) (also known as spectral beam combining) is a technique used in telecommunications and spectroscopy to address the problem of position- and wavelength-dependent steering caused by collimating beams from an array. In WBC, the laser beams from an array are merged into a single, co-linear beam of spatially overlapping outputs that can then be propagated into the far field or perhaps through an absorption cell. This method takes on many physical embodiments, depending on the application.

For example, in Wavelength Division Multiplexing, a central technique in telecommunications, the outputs of multiple fiber-coupled single frequency lasers are merged into one single fiber for long distance transmission.

Yet another example is the WBC of free space infrared lasers using either "open loop" or "closed loop" approaches. One example of open loop beam combining involves an array of single frequency QCLs that are coupled to a non-actively aligned dispersion element using either an array of matched lenses or a single collection lens. The blaze spacing and angle of the grating are chosen to correct for the physical and wavelength separation of the array members such that the grating disperses each laser wavelength at a slightly different angle. The result is that all wavelengths are overlapped in space and propagated together (co-linearly) in the far field.

In the closed loop approach to WBC, the array instead comprises more-or-less identical emitters, where the emission wavelength is not differentiated in the laser itself. Rather, the dispersion element, in combination with an output coupler, acts to form a laser cavity such that each laser's frequency is determined by feedback from the dispersion element. As with the "open loop" approach, this technique results in a beam of spatially overlapping contributions of different frequencies.

In both open-loop and closed-loop WBC, a beam-combined laser array system has some advantages over non-beam combined array outputs, including higher degree of spatial symmetry and an improved beam quality parameter, $M^2$. Indeed, beam combining of QCL arrays has be shown to produce near diffraction limited (where $M^2=1$) performance in the far-field. Improved beam symmetry, spatial overlap, and $M^2$ are all useful in many applications in molecular spectroscopy, infrared countermeasures (IRCM), and fiber coupling of laser arrays.

SUMMARY

Aspects and embodiments are directed to methods and apparatus that apply laser arrays with lens arrays and a detector for spectroscopic interrogation. As discussed in detail below, the output of an array of tunable lasers may be collected with an array of lenses or microlenses and used for detection and quantification of chemicals/compounds that have absorption features within the spectral range of the emitter array.

Embodiments of the present invention include systems and methods for sensing a spectroscopic signature of a sample, such as a bodily fluid, a gas, an adsorbed solid, an adsorbed liquid, a gas phase component of a surface-adsorbed solid, or a gas phase component of a surface-adsorbed liquid, without WBC or other beam-combining techniques. In one embodiment, the system comprises a transmitter, which includes an array of quantum cascade lasers (QCLs) and an array of lenses, and a transmitter. In operation, the array of QCLs emits an array of non-coincident (e.g., substantially parallel or intersecting) laser beams to the array of lenses, which substantially collimates the array of non-coincident laser beams. The transmitter transmits this array of non-coincident laser beams to the sample (e.g., over a distance of 10 cm, 1 m, 5 m, 10 m, or 100 m) so as to produce radiation that is scattered, reflected, and/or transmitted by the sample. The receiver, which is also in optical communication with the sample, detects at least a portion of the radiation and provides a signal representative of the spectroscopic signature of the sample based on the detected radiation.

In some examples, the array of QCLs is configured to tune a wavelength of one or more laser beams in the array of laser beams without changing the wavelength-tuned beams' far-field pointing angles. (Conversely, tuning the wavelength of a beam in a WBC system causes the beam's far-field pointing angle to change as explained below.) The array of QCLs may also be configured to generate one or more of the laser beams in the array of non-coincident laser beams at different wavelengths, e.g., so as to provide a frequency comb or an array of laser beams with a predetermined wavelength spacing.

Some examples of the array of lenses include at least one lens having a beam divergence angle of about 0.5 degrees to about 8.0 degrees (e.g., about 5.0 degrees). The array of lenses may also include at least one aspheric lens, spherical lens, diffractive lens, or graded-index lens. The transmitter may also include a telescope, in optical communication with the array of lenses, to cause the array of non-coincident laser beams to propagate towards the sample. In some geometries, the telescope may also collect radiation that is scattered and/or reflected from the sample.

Exemplary systems may also include a sample holder to hold the sample in the path of the array of non-coincident laser beams. For instance, the sampler holder may include a transmissive cell, an adsorbing surface, a microfluidic channel, and/or a multipass absorption cell, which may For solid or liquid samples, the sample holder may hold the sample such that the array of non-coincident laser beams strikes the sample's surface. Liquid and gaseous samples may flow through the sample cell during illumination or between bursts of illumination from the transmitter.

In another embodiment, a system for sensing a spectroscopic signature of a sample includes an array of QCLs, an array of lenses, a multipass absorption cell, and a detector. In operation, the array of QCLs emits an array of substantially parallel laser beams comprising lasers beams at different wavelengths. The array of lenses, which is in optical communication with the array of QCLs, substantially collimates the array of parallel laser beams. The multipass absorption cell, which is in optical communication with the array of lenses, receives the array of parallel laser beams from the array of lenses, directs the array of parallel laser beams along multiple passes (e.g., 10, 20, 30, 40, 50, or 100 passes) through a least a portion of the sample, and emits the array of parallel laser beams after it propagates through the sample. The detector, which is in optical communication with the multipass absorption cell, detects the array of parallel laser beams so as to provide a signal representative of the spectroscopic signature of the sample.

In some examples, the system also includes a current source and/or a heatsink. The current source is in electrical communication with the array of QCLs, and the heatsink is in thermal communication with the array of QCLs. The current source and/or the heatsink may be used to tune a wavelength of one or more laser beams in the array of laser beams without changing the wavelength-tuned laser beams' far-field pointing angle(s).

Other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
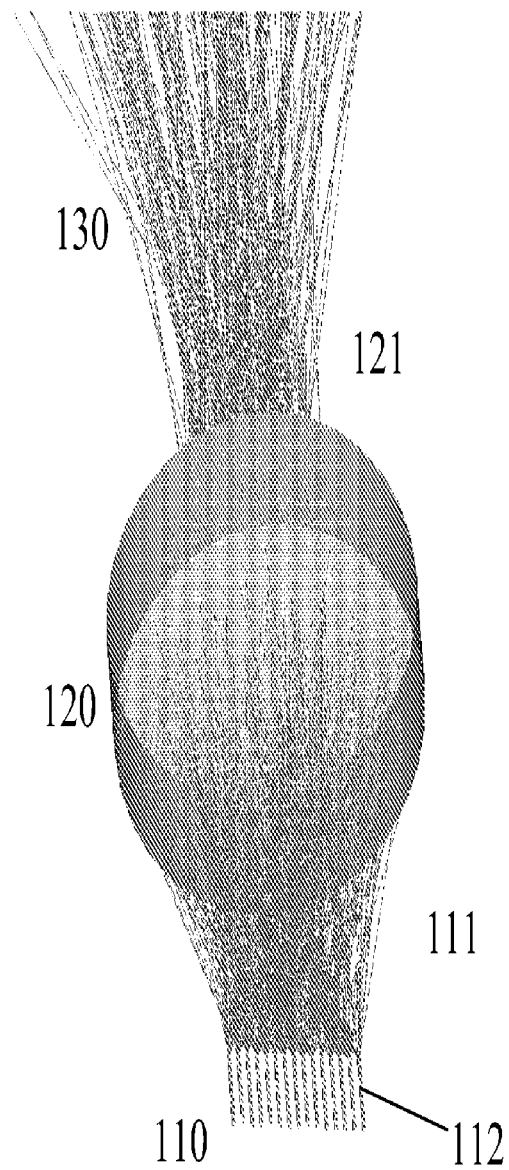
FIG. 1 is a ray trace simulation of a closely spaced 1-D laser array coupled to a single spherical collimation lens placed one focal length array from the center laser.

FIG. 1 illustrates an optical system in which an array 110 of one-dimensional Quantum Cascade Lasers 112 (two-dimensional laser arrays are also possible). As understood by those of skill in the art, QCLs 112 are electrically driven semiconductor lasers. They may be efficient, reliable, and compact enough to be separated from each other by about 20 µm to about 500 µm. QCLs 112 emit light or laser at room temperature at wavelengths spanning about 3 µm to about 24 µm. They may also emit radiation at Terahertz frequencies. These wavelength ranges overlap many molecular absorption lines of interest. The QCLs 112 in the array 110 may employ distributed feedback (DFB) or any other suitable mechanism to promote emission at a single longitudinal frequency. Each QCL 112 in the array 110 may lase at a unique frequency with a tuning range that is contiguous with or overlaps the tuning range of one or more other QCLs 112 in the array 110. Individual QCLs 112 can achieve watt-level output power in continuous-wave operation at room temperature and can be designed to have broadband gain such that the lasing wavelength can be tuned over a broad spectral range of approximately 300 $cm^{-1}$. The QCLs 112 in the array 110 may be operated in any number of temporal permutations, from one at a time to fully simultaneously.

In the case of FIG. 1, the emission 111 from the array 110 is directed onto a refractive collimating lens 120 to produce a slightly focused 121 but poorly collimated beam 130. Such a beam 130 is of limited utility for chemical sensing and other applications due to the high divergence, which reduces the power density dramatically and nonlinearly.

As described above (and in U.S. Patent Application Publication No. 2012/0033697 to Goyal et al., which is incorporated herein by reference in its entirety), wavelength beam combining (WBC) can be used to transform a set of beams from a laser array into single beam. For many applications, however, WBC is not necessary and may even be undesirable due to the added complexity and cost of introducing and aligning a grating. While WBC also improves beam symmetry, this too is often unnecessary in one- and two-dimensional tunable laser arrays.

Because the QCL array spacing (which may be, e.g., 20-500 µm) may be much smaller than the beam diameter normally employed in spectroscopic applications (which may be, e.g., 5-50 mm), further beam combining such as WBC is not always necessary or desired in spectroscopic systems. In addition, WBC with a diffractive element suffers from beam steering as the laser wavelength is tuned due to the change in diffraction angle as the wavelength changes. However, using lens arrays in combination with traditional reflective or refractive elements eliminates this problem.

Figure 2:
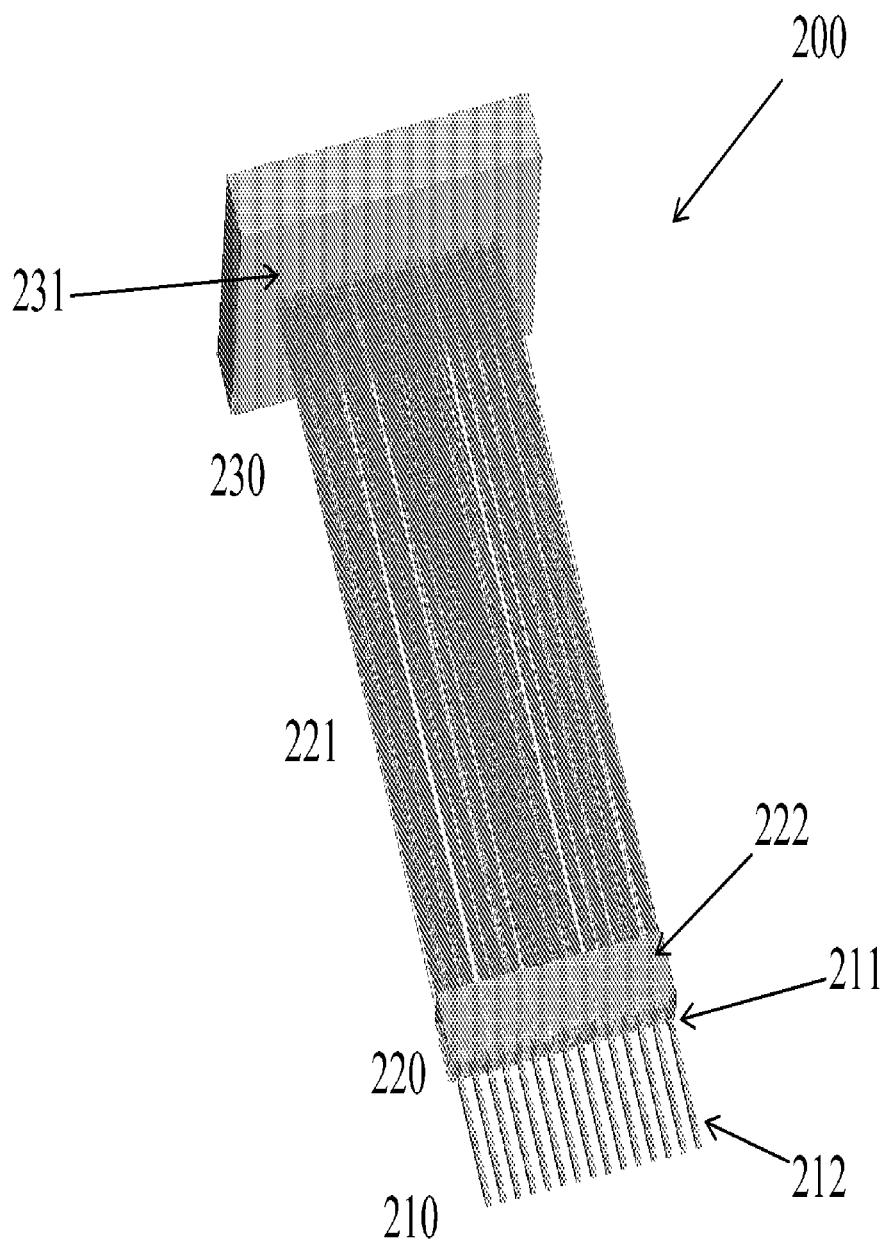
FIG. 2 is a ray trace of the same laser array shown in FIG. 1B coupled to a monolithic array of lenses.

FIG. 2 illustrates a spectroscopy system 200 that employs a one-dimensional array 210 of quantum cascade lasers (QCLs) 212. (Two-dimensional QCL arrays are also possible.) This spectroscopy system 200 can be used to analyze liquids and gases in multiple sampling configurations, including those disclosed herein. The spectroscopy system 200 also includes an array 220 of lenses 222, or microlenses 222, where each lens 222 in the array 220 has a focal length f, which may range from hundreds of microns to tens of centimeters. The lenses 222 in the lens array 220 may be spherical lenses, aspheric lens, astigmatic lenses, cylindrical lenses, graded index (GRIN) lenses, diffractive lenses, refractive/diffractive lenses, or any other suitable type of lens. The lens array 220 may be monolithic and can be affixed to or integrated with laser array 210 once properly aligned. Alternatively, the system 200 may include an adjustment tool to align and/or position the lens array 220 with respect to the laser array 210.

As shown in FIG. 2, the lens array 220 is disposed a distance f from the laser array 210 such that the lens array 220 substantially collimates the diverging beams 211 emitted by the laser array 210. The resulting substantially collimated beams 221 propagate along parallel optical axes. Each individual beam in the figure has a diameter of about 0.2 mm to about 3.0 mm, depending on the focal length of the lenses used as well as on lens clear aperture. Similarly, each beam is of high Gaussian character such that the beam quality parameter $M^2$ of each lasers collimated output ranges between about 1.0 and about 1.7. The lens array 220 may also be moved closer to or farther from the laser array 210 to produce beams that come to a focus or diverge as desired.

In any case, the beams transmitted through the lens array remain non-coincident—that is, they propagate along optical axes that are parallel, intersecting, or skew rather than overlapping.

The parallel collimated beams 221 propagate to a sample holder 230 that contains a sample 231 for spectroscopic interrogation. The sample holder 230 may be a chamber with transparent (or translucent) walls that define a cavity to hold a fixed volume of a fluid sample, such as a gas or a liquid. Alternatively, the sample holder 230 may form part of a channel (e.g., a microfluidic channel) through which a fluid such passes. For instance, the sample holder 230 may even be part of a human or animal body, such as a blood vessel, and the sample may be a bodily fluid, such as blood. In another embodiment, the sample holder 230 is a surface that holds or supports adsorbed sample molecules. The sample holder 230 may disposed microns (e.g., 1 µm, 5 µm, 10 µm, 25 µm, 50 µm, etc.) to millimeters (e.g., 1 mm, 5 mm, 10 mm, 25 mm, 50 mm, etc.) to centimeters (e.g., 1 cm, 2.5 cm, 5 cm, 10 cm, etc.) from the lens array 220.

Figure 6:
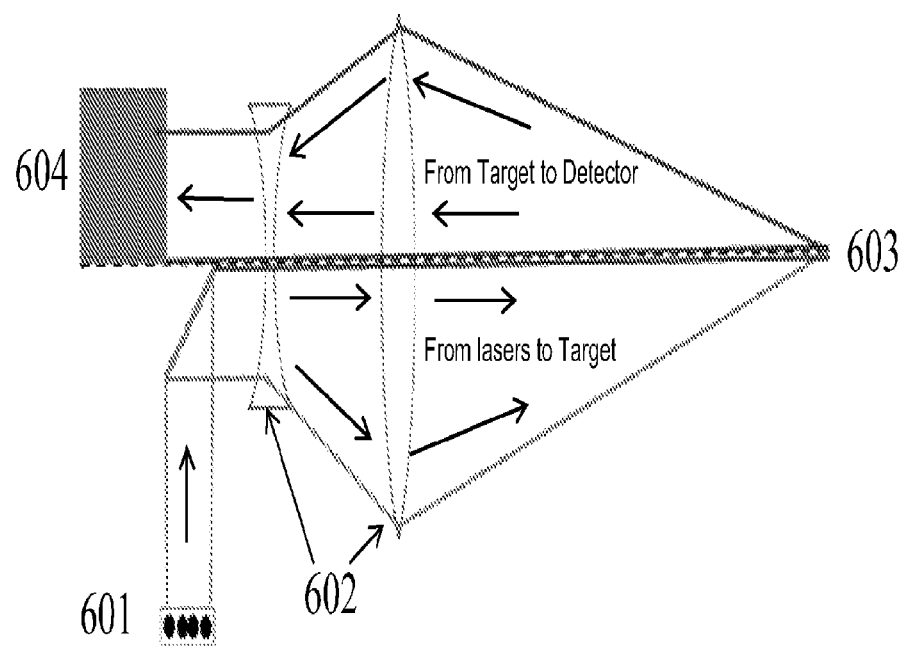
FIG. 6 is a schematic diagram of the laser beams from the microlensed coupled laser array shown in FIG. 2 being launched into the far field through a refractive telescope, which also serves to collect light that is scattered from a target.
Figure 7:
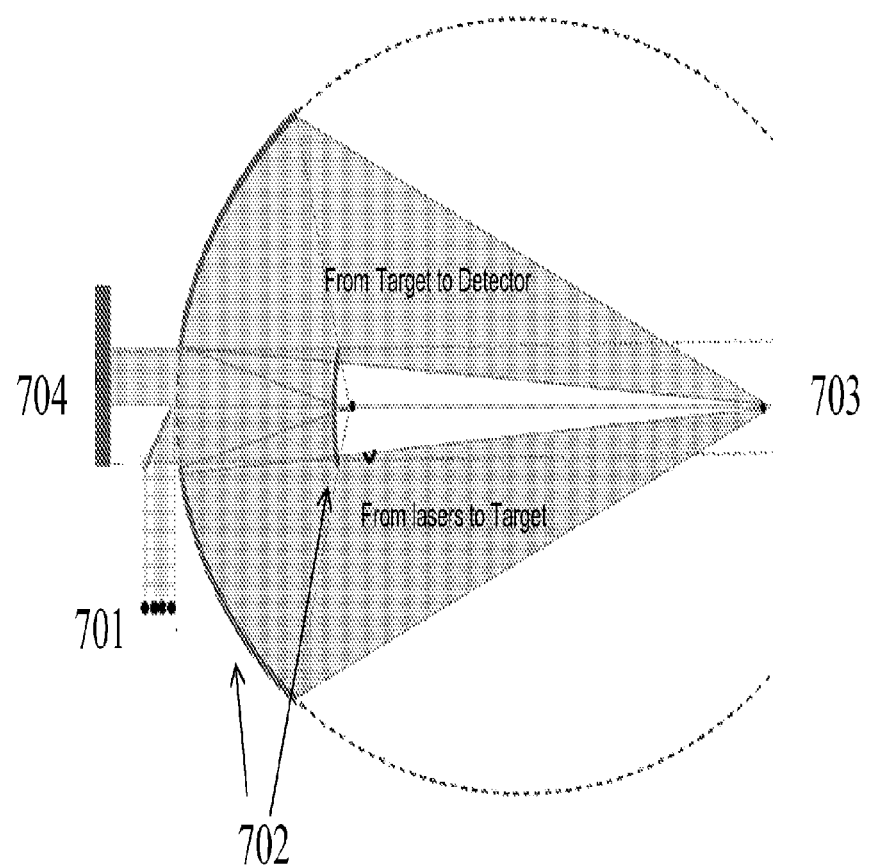
FIG. 7 is a schematic diagram of the laser beams from the microlensed coupled laser array shown in FIG. 2 being launched into the far field through a reflective telescope, which also serves to collect light that is scattered from a target.

The parallel collimated beams 221 illuminate the sample 231, which selectively reflects and/or absorbs some or all of the incident radiation. In some instances, the sample holder 230 will be an existing structure such as a human body, clothing, a piece of baggage, an potential hazard, a pharmaceutical container, or an automobile part where the sample 231 is interrogated by the beams 221 and the absorbed, transmitted or backscattered light is detected. In such cases, it may be desirable to include a telescope to direct the beams 221 toward the target and simultaneously to collect the backscatter, as shown in FIGS. 6 and 7.

Figure 3:
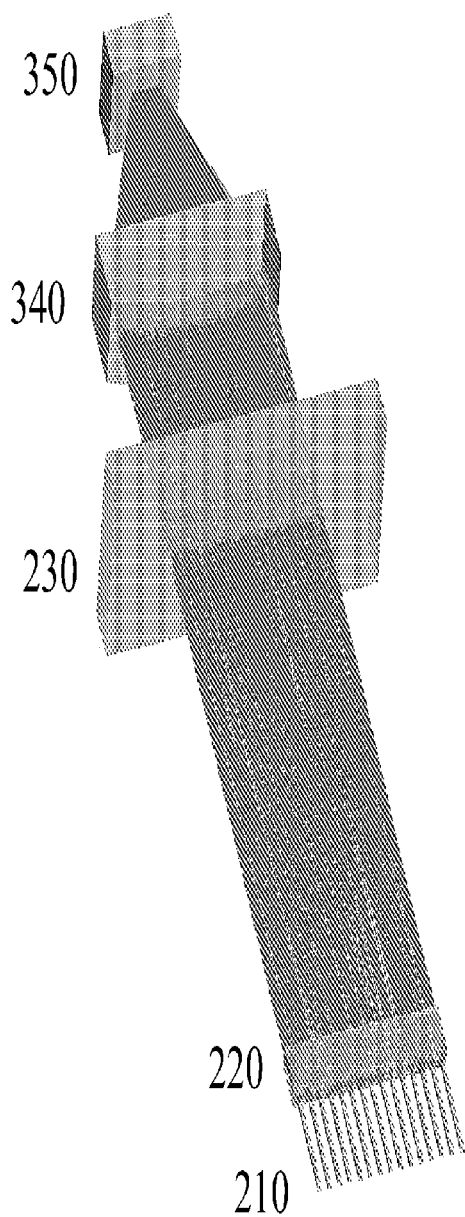
FIG. 3 is a schematic diagram of an absorption spectroscopy system that includes the microlens-coupled laser array shown in FIG. 2.

A detector 350 (FIG. 3) detects the reflected or transmitted portions of the parallel collimated beams 221 and produces an indication of the sample's spectrum. If desired, a cylindrical lens 340 (FIG. 3) can be used to circularize the collimated beams 221 transmitted through the sample holder before illuminating the detector 350. The detector 350 generates an electrical signal (e.g., a photocurrent) that varies in amplitude as a function of the intensity of the detected radiation.

Compared to spectroscopy systems that use WBC, the spectroscopy system 200 shown in FIG. 2 is simpler to build and align, more rugged, and more compact. As discussed later, it also more immune to beam-steering that is typical of diffraction based WBC as the lasers are tuned. Using small lenses 222 to collect the light from the QCLs 212 in the laser array 210 preserves the transverse spacing properties of the array, while maximizing collection efficiency into the far field 230.

Figure 4:
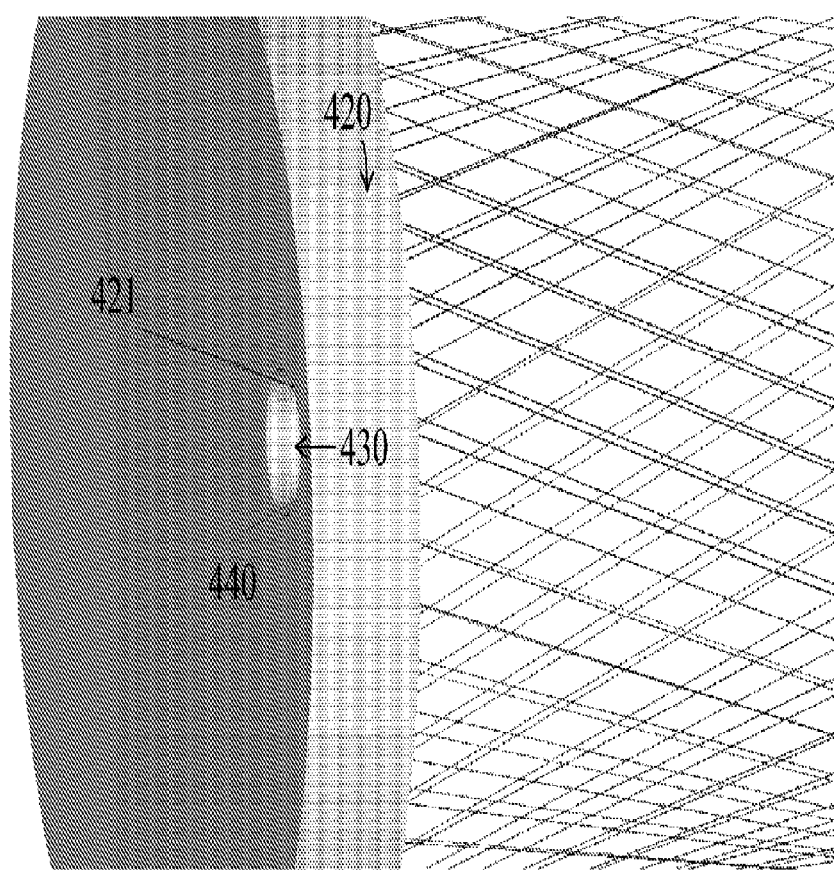
FIG. 4 is a schematic diagram of a single collimated laser coupled to a Herriott cell for analysis of gases using absorption spectroscopy system.
Figure 5:
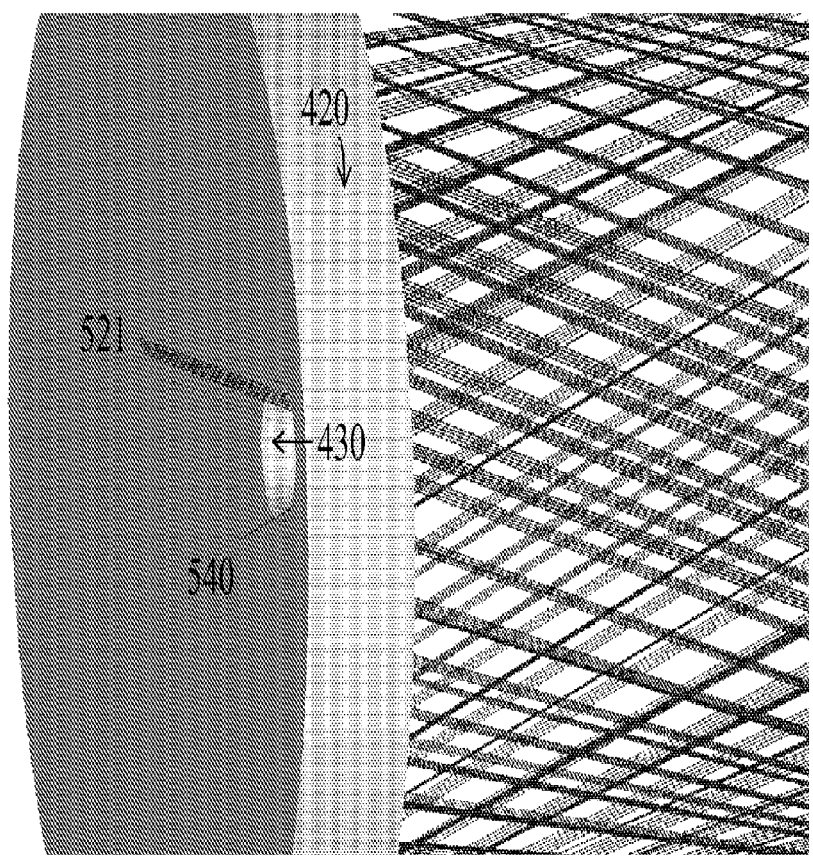
FIG. 5 is a schematic diagram of the laser beams from the microlens coupled laser array shown in FIG. 2 being launched to the same Herriott cell as in FIG. 4.

Another embodiment of tunable laser arrays with microlenses is the analysis of gases using multipass absorption cells, in which the entrance hole diameter is typically small in relation to the size of the entrance mirror, as shown in FIG. 4. In the particular embodiment in FIG. 4, a single collimated laser beam 421 is injected into a cavity defined by two spherical mirrors 420. The beam 421 bounces back and forth many times before it exits the cell from an injection hole 430 in the form of a beam 440 that can then be detected. Due to the extremely close spacing of adjacent lasers in a QCL array, many laser beams can be coupled into an identical cell, as shown in FIG. 5, which depicts the identical optical cavity 420 of FIG. 4 but uses an array of five substantially collimated, non-coincident laser beams 521 spaced 200 microns apart. While the entrance hole 430 is small, it can accommodate the substantially collimated collection of laser beams shown in FIG. 2, which is very useful in that more than one frequency can then be injected to the same cavity. Note that in FIG. 5, all five beams exit from the same hole 430 as indicated by rays 540. (Rotation of the rays 540 with respect to the fixed cell with each pass cause the rays 540 to appear coincident when viewed from the side in FIG. 5.)

Using multiple laser beams 521 increases the number of chemical species or aerosol that can be interrogated in a single apparatus and is enabled by the realization that array systems that use microlenses may produce non-overlapping beams, but that this is not at all detrimental to the performance in certain cases. Also noteworthy is that unlike the analysis situation depicted in FIGS. 2 and 3, where a spherical lens may still be used for array collimation due to the short distances involved, using a single lens to collimate an array such as depicted in FIG. 1 is not implementable in a multipass cell apparatus or standoff detection situation, where the beams traverse distances exceeding several centimeters.

Another embodiment involves the use of laser arrays with microlenses for a standoff detection such as that depicted in FIG. 6. Standoff detection may occur over a distance of centimeters (e.g., 1 cm, 10 cm, 25 cm, 50 cm, etc.) to meters (e.g., 1 m, 10 m, 25 m, 50 m, 100 m) or even kilometers (e.g., 1 km, 10 km, 25 km, 50 km, 100 km, etc.). Here, the output of a tunable laser array is substantially collimated using microlenses 601 and coupled to a refractive telescope 602 before propagating into the far field. In this embodiment, it is the backscattered light from a target 603 that is collected and analyzed. For example, light from a microlensed array of DFB QCLs is directed toward a surface on which one or more chemicals are adsorbed. A telescope directs the collimated beams from the array toward the target and collects the backscattered photons at detector 604.

Similarly, a reflective telescope could be used for standoff detection, as in FIG. 7. Here, the output of a tunable laser array is collimated using microlenses 701 and coupled to a reflective telescope 702 before propagating into the far field. Backscattered light from a target 703 that is collected by the telescope and directed onto a detector 704.

In such standoff detection embodiments, light from the array impinges on the adsorbed material, is differentially absorbed based on the materials wavelength-dependent molecular fingerprint, and scatters in many directions. Some of the light is scattered back toward a telescope which is used to collect a portion of the backscattered radiation and direct it onto the detector. In this embodiment, the laser spacing itself becomes insignificant relative to the typical beam divergence as the laser beams are propagated into the far field. For instance, in the standoff embodiments described above, the beam divergence of each of five laser beams after lens collimation may be about 0.5 degrees to about 8.0 degrees (e.g., 1.0 degree, 2.0 degrees, 3.0 degrees, 4.0 degrees, 5.0 degrees, 6.0 degrees, or 7.0 degrees). Depending on this divergence, at propagation distances of several meters each beam's intensity becomes distributed over many times the beam diameter. The tiny lateral spacing between lasers becomes vanishingly small.

Figure 8:
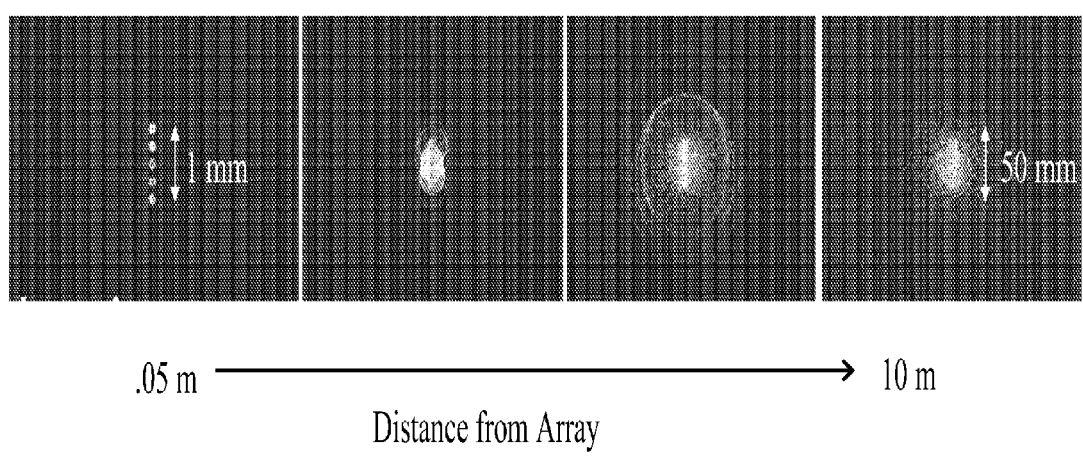
FIG. 8 shows the beam profile of a lensed array of five lasers for various distances from the array.

This is illustrated in FIG. 8, where the raytrace of five tunable lasers spaced 200 microns apart is executed into the far field (without first coupling to a telescope). From left to right, the distance between the collimated array and the target increases. The uniformity of the overall photon flux increases as distance from the array increases, such that at long distances it is no longer evident that the light can be traced back to spatially separated individual emitters. While a telescope may still be employed, in particular to collect diffuse backscattered light from a target, it is not always required for directing the array output toward the target.

Another embodiment utilizes a similar experimental setup as shown in FIG. 6 and FIG. 7 and as described above, but instead uses the solid scattering surface for reflection only. In such an embodiment, it is the interstitial air that is being sampled for the presence of a gas or aerosol of interest. One example is the examination of vaporized explosives residues, rather than the bulk explosive itself.

It is noteworthy that in the case of backscatter collection in standoff embodiments, light from each laser is scattered from the surface over a wide range of angles. This leads to a divergence in the back reflected light that tends to dominate the SNR limitations of the experiment far more than the imperfect overlap of the beams from the laser array. For a given detector position with respect to a scattering target distance r away, the collected backscattered photon flux has a $1/r^2$ dependence.

Note also that in the case of far-field propagation, illuminating a target with non-coincident laser beams is not only simpler, but actually may be better than in a situation where WBC is implemented. The reason has to do with the slight pointing error that is introduced in an open loop WBC implementation as the laser is tuned based on the grating equation. Specifically, in open-loop WBC, the angle at which the grating should be placed relative to the array or transform lens such that the beams co-propagate may be deduced from the following grating equation:

$$d(\sin \theta_m + \sin \theta_n) = m\lambda_n \quad (2)$$

In Equation (2) d is the groove spacing of the grating, $\theta_m$ is the output angle of the m-th diffraction order, $\theta_n$ is the incident angle of the n-th laser beam on the grating, and $\theta_n$ is the wavelength of that (n-th) laser. The incident angles, $\theta_n$, of the laser elements in the array are all different and satisfy the following equation:

$$\theta_n = \theta_{grating} + \tan^{-1}\left(\frac{x_n}{f}\right) \quad (3)$$

In Equation (3) $x_n$ is the position of the n-th laser in the array and f is the focal length of the transform lens. For all the beams to co-propagate, all the lasers in the array have the same output angle $\theta_m$. However, as a laser is tuned in wavelength using injection current or heatsink temperature, the resulting change in $\lambda_n$ is often great enough that the resulting shift in angle $\theta_m$ corresponds to a misdirected laser, an error which is amplified for long distance propagation. By using a lens array and perhaps one or more reflective or refractive optics, no appreciable change in far-field pointing is introduced for the 10 cm$^{-1}$ per-laser tuning in $\lambda_n$ that is typically induced with laser current and/or heatsink tuning. This is also beneficial for applications where high power has to be transmitted over large distances such as infrared countermeasures and standoff detection.

Another possible embodiment of laser arrays coupled to lens arrays without WBC includes cavity enhanced spectroscopy, including as Integrated Cavity Output Spectroscopy or Cavity Ringdown Spectroscopy. In these systems, light is injected into a cavity composed of two or more highly reflective surfaces such that it traverses a pathlength that is many times the mirror separation itself. Whether introduced via either an axial or "off-axis" optical injection geometry, the concavity of the cavity mirrors serves to continually focus and direct the injected radiation. In principle, many parallel laser beams can be coupled into a single cavity, increasing the number of analytes that can be studied while not increasing instrument size, weight, or power appreciably. Here again, actually overlapping the laser beams is generally not necessary, as it is the residence time of each frequency within the cavity that serves to define the interaction length, rather than the precision of the alignment. This residence time can determined individually for each array member by measuring the decay time of that particular frequency from the optical cavity. For an empty cavity, this decay time, τ, is approximated by:

$$\tau = \frac{L}{c(1-R)} \quad (4)$$

Where τ is the average cavity residence time of a photon, L is the separation of the mirrors, c is the speed of light and R is the reflectivity of the cavity mirrors. For example, in a two-mirror cavity formed by mirrors with identical 99.95% reflectivity spaced 1 m apart, the time constant is 6.67 μs.

Figure 9:
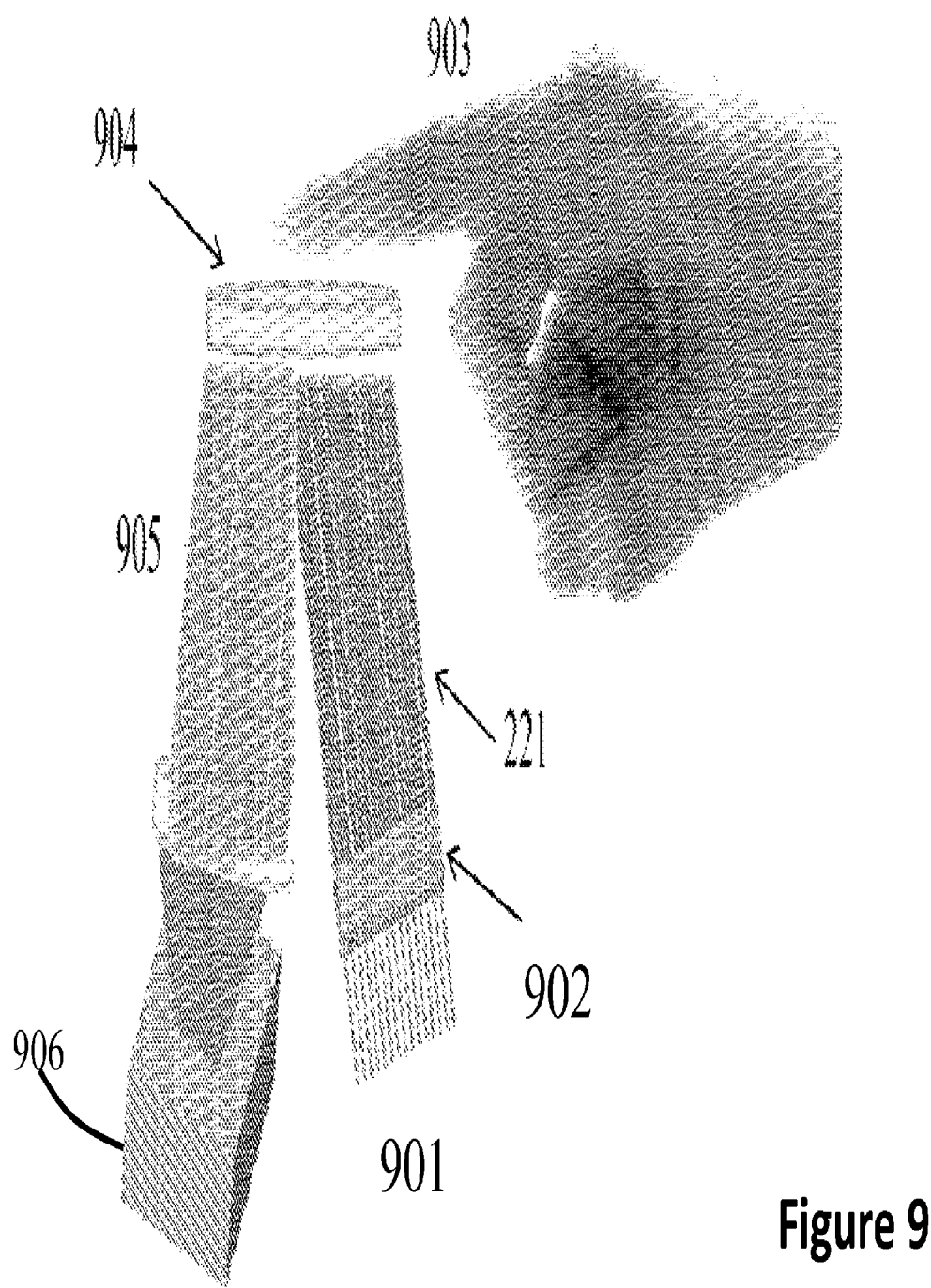
FIG. 9 shows an apparatus for examining blood glucose in human blood using a QCL array and detector.

Another novel embodiment of laser arrays coupled to lens arrays is a compact sensor for examining fluids in the human body, as illustrated in FIG. 9. Here, the output of a laser array 901 includes at least one laser that propagates through a matched microlens array 902 and shines on the skin of a human finger 903 which has been placed on a flat surface 904. Some of the light penetrates the outer skin layers and interacts with body fluids, such as blood. A portion of the light carrying the absorption signature of the analyte of interest is then reflected 905 from the finger and detected by a detector 906. In some cases, the detector also includes a focusing lens for collecting the reflected light onto the detector surface. In this system, it becomes possible to analyze, for example, blood glucose levels in humans without WBC of the tunable laser array. Such a sensor could also be constructed in such a way that the laser energy is directed through a layer of skin directly onto a detector. For example, there exist thin sections of the human body through which infrared light may transmit. In such a case, the transmitted light would carry the absorption spectrum of interest.

Advances in lithographic fabrication techniques have made it possible to fabricate microlenses 222 with a variety of surface topographies, including astigmatic and aspheric shapes, allowing for even better performance than may be obtained using, for instance, typical microlenses 222 with a spherical surface figure. This is extremely advantageous in the case of QCL collimation, due to the fact that these lasers exhibit rapid and non-uniform divergence in the X and Y directions (Where Z is the direction of beam propagation into the far field). Aspheric lenses are customary for the collimation of laser diodes and QCLs using individual optics, but have to our knowledge not been expanded to the collimation of QCL arrays 210.

Figure 10:
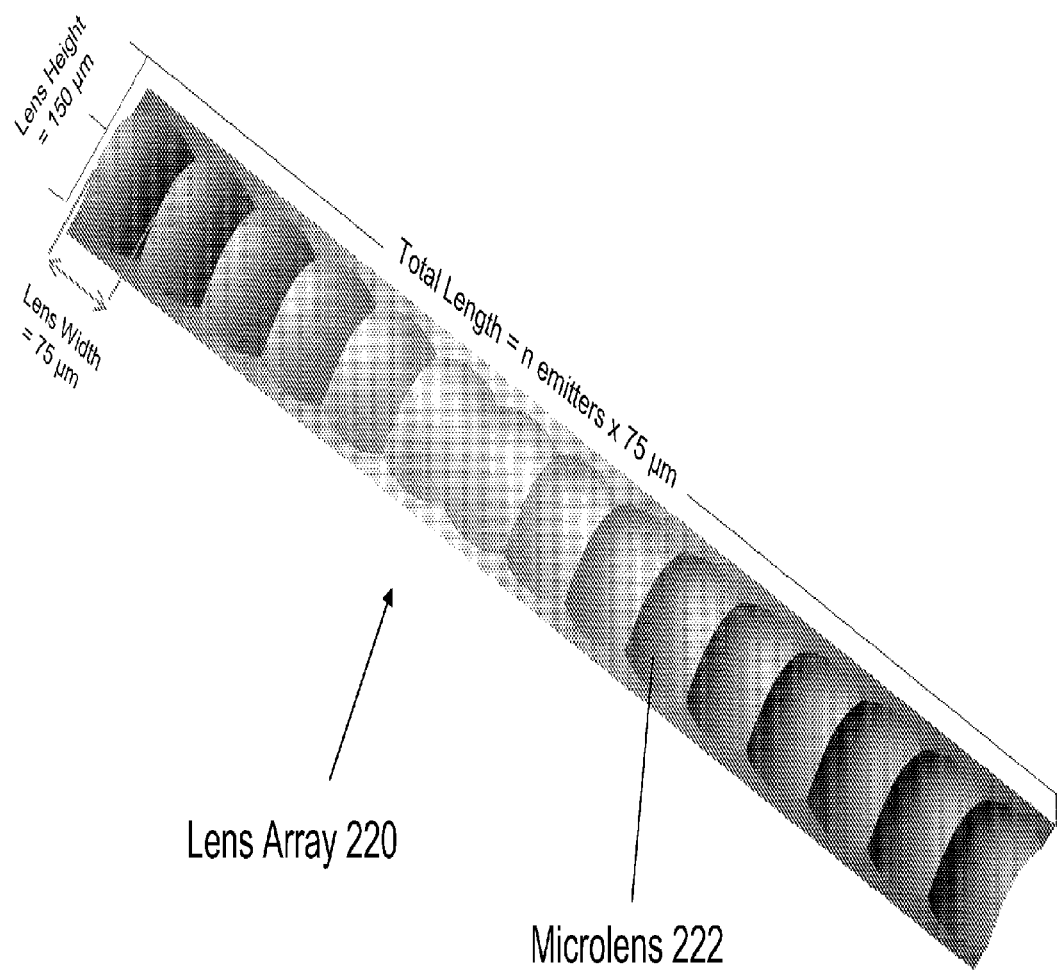
FIG. 10 shows a contour model of a microlens array where only the curved surface is included for clarity. This particular array is a 1×15 element system where 1 is the number of lenses in the Y direction and 15 is the number of lenses in X.

Further, due to the nature of the lithographic process of lens array fabrication, it is straightforward to fabricate standalone microlenses 222 and microlens arrays 220 where each lens is non-uniform in its X and Y physical dimensions in order to provide a more full collection of light emitting from the QCLs, which have sharply higher divergence in the direction perpendicular to the plane of the substrate (Y) than in the direction that is parallel to the laser substrate (X). FIG. 10 shows a contour model of a 15-element microlens array 220 that illustrates how a lens array 220 can be fabricated so as to maximize the collection efficiency of QCL array 210 (FIG. 2) in which divergence is higher in the direction perpendicular to the substrate than in the plane of the substrate (also the plane of array propagation). In FIG. 10 the width of an individual microlens 222 is 75 microns while the height is twice that, 150 microns. Such a microlens array 220 will have higher collection efficiency for a QCL array 210 where the spacing between emitters is about 75 microns. Lens efficiency can also be improved by adding some aspheric character to the lens surface, so as to reduce spherical aberration.

Figure 11:
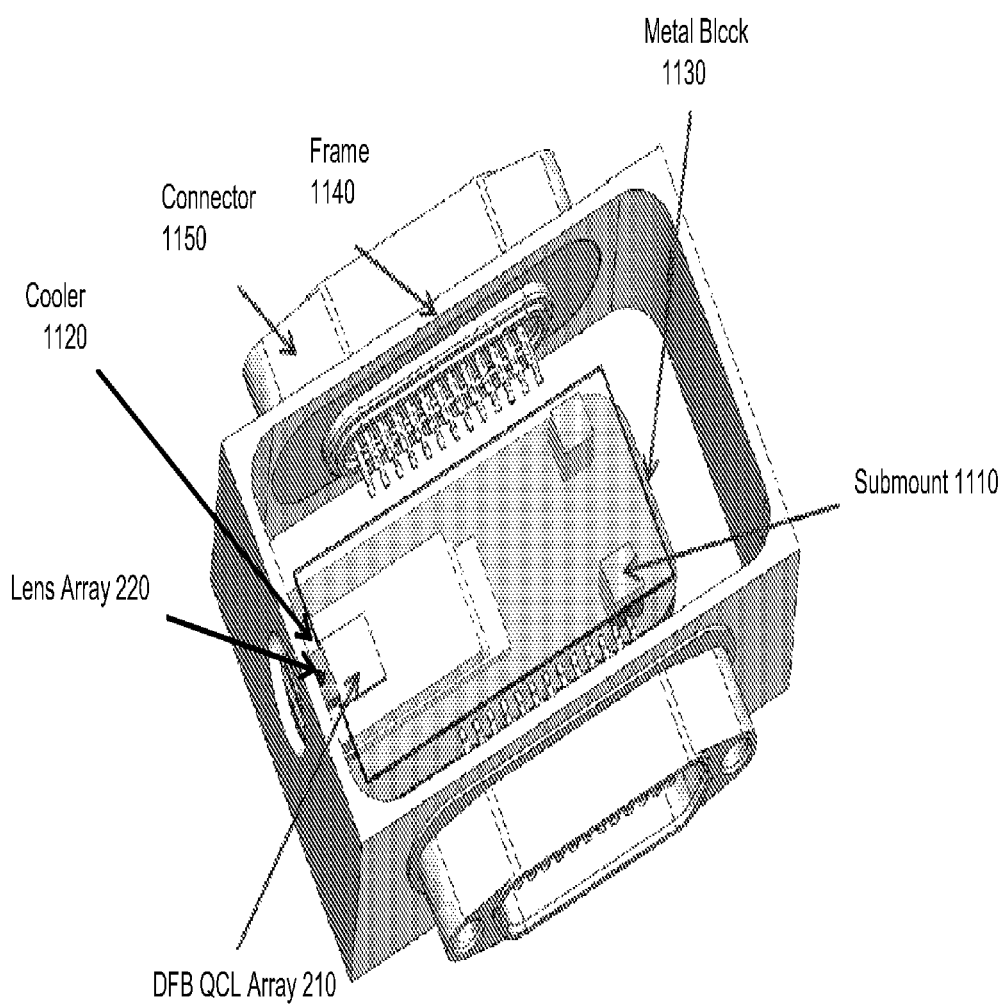
FIG. 11 shows a three-dimensional design for a packaged QCL array which includes an array of microlenses, thermoelectric cooler, electrical contacts, enclosure, and exit window.

Once packaged, the QCL array 210 with lens array 220 may take the form of the model shown in FIG. 11 where it may serve as the light source for a broader spectroscopic system. Here the laser array 210 is placed on an Aluminum Nitride submount 1110 which in turn rests on a Thermo-electric cooler 1120 that serves to maintain the temperature of the QCL array 210. Heat from the QCL array 210 is transferred to the Copper/Tungsten metal block (heatsink) 1130. As each QCL 212 in the array 210 is individually addressable, the submount 1110 may be patterned with metal traces that connect the lasers 212 in the array 210 with the connector 1150 through the package frame 1140. One aspect of the design shown in FIG. 11 is that the QCL array 210 and the lens array 220 are placed on the same height stack such that small changes the expansion and contraction of the metal block 1130, Kovar frame 1140, and/or the cooler 1120 do not result in changes in alignment of the lens array 220 with respect to the laser array 210.

Other possible embodiments of laser arrays coupled to lens arrays without WBC include infrared countermeasures (IRCM), detection of explosives or chemical warfare agents, monitoring of toxic industrial compounds, free-space optical communication, and the marking and cutting of plastics and metals.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for sensing a spectroscopic signature of a sample, the system comprising:
   an array of lasers to emit an array of substantially parallel laser beams comprising lasers beams at different wavelengths;
   an array of collimating lenses, in optical communication with the array of lasers, to substantially collimate the array of substantially parallel laser beams, each substantially parallel laser beam in the array of substantially parallel laser beams after the array of collimating lenses having a beam divergence of about 0.5 degrees to about 8.0 degrees and overlapping with at least one other substantially parallel laser beam in the array of substantially parallel laser beams at the sample; and
   a detector, in optical communication with the sample, to detect at least a portion of the array of substantially parallel laser beams scattered and/or reflected from the sample so as to provide a signal representative of the spectroscopic signature of the sample.

2. The system of claim 1, wherein the array of lasers comprises an array of quantum cascade lasers.

3. The system of claim 2, wherein at least one collimating lens in the array of collimating lenses is a non-uniform lens configured to compensate for non-uniform divergence of a corresponding substantially parallel laser beam in the array of substantially parallel laser beams emitted by a corresponding quantum cascade laser in the array of quantum cascade lasers.

4. The system of claim 1, wherein the array of lasers is configured to emit the array of substantially parallel laser beams over a wavelength range of about 3 µm to about 25 µm.

5. The system of claim 1, wherein the array of collimating lenses comprises a monolithic array of collimating lenses integrated with the array of lasers.

6. The system of claim 1, further comprising:
   a telescope, in optical communication with the array of collimating lenses, to project the array of substantially parallel beams into a far field.

7. The system of claim 6, wherein the telescope is further configured to collect the at least a portion of the array of substantially parallel laser beams scattered and/or reflected from the sample.

8. The system of claim 1, further comprising:
   a sample holder, in optical communication with the array of collimating lenses, to hold the sample.

9. The system of claim 8, wherein the sample holder comprises a microfluidic channel that holds the sample.

10. A method of sensing a spectroscopic signature of a sample, the method comprising:
    emitting an array of substantially parallel laser beams comprising substantially parallel laser beams at different wavelengths;
    substantially collimating the array of substantially parallel laser beams, each substantially parallel laser beam in the array of substantially parallel laser beams having a beam divergence of about 0.5 degrees to about 8.0 degrees after collimating;
    overlapping each substantially parallel laser beam in the array of substantially parallel laser beams with at least one other substantially parallel laser beam in the array of substantially parallel laser beams at the sample; and
    detecting at least a portion of the array of substantially parallel laser beams scattered and/or reflected from the sample so as to provide a signal representative of the spectroscopic signature of the sample.

11. The method of claim 10, wherein emitting the array of substantially parallel laser beams comprises emitting the array of substantially parallel laser beams from an array of quantum cascade lasers.

12. The method of claim 11, wherein substantially collimating the array of substantially parallel laser beams comprises collimating a substantially parallel laser beam with a non-uniform lens configured to compensate for non-uniform divergence of the substantially parallel laser beam.

13. The method of claim 10, wherein emitting the array of substantially parallel laser beams comprises emitting the array of substantially parallel laser beams over a wavelength range of about 3 µm to about 25 µm.

14. The method of claim 10, wherein substantially collimating the array of substantially parallel laser beams comprises collimating the array of substantially parallel laser beams with a monolithic array of collimating lenses integrated with an array of lasers.

15. The method of claim 10, wherein overlapping each substantially parallel laser beam comprises projecting the array of substantially parallel laser beams into a far field with a telescope.

16. The method of claim 15, further comprising:
    collecting the at least a portion of the array of substantially parallel laser beams scattered and/or reflected from the sample with the telescope.

17. The method of claim 10, further comprising:
    disposing the sample within a microfluidic channel.

* * * * *